United States Patent

[11] 3,612,613

[72] Inventor Alfred J. Tricon
9654 Winsome Lane, Houston, Tex. 77042
[21] Appl. No. 31,299
[22] Filed Apr. 23, 1970
[45] Patented Oct. 12, 1971

[54] AUXILIARY SUPPORTING, TRACTIVE AND CAPSTAN WHEEL FOR VEHICLES
4 Claims, 5 Drawing Figs.

[52] U.S. Cl. ..................................................... 301/41, 242/95
[51] Int. Cl. ...................................................... B60b 15/26
[50] Field of Search ............................................ 301/36, 38, 41, 43, 47; 180/7

[56] References Cited
UNITED STATES PATENTS
1,721,278  7/1929  Nelson .......................... 301/36
2,336,959  12/1943  Redman ......................... 301/38
2,793,704  5/1957  Faszczuk ....................... 180/6
3,128,128  4/1964  Jines............................. 301/47

FOREIGN PATENTS
1,052,308  9/1953  France .......................... 301/38
940,061  10/1963  Great Britain................ 301/38

Primary Examiner—Richard J. Johnson
Attorney—Alexander & Dowell

ABSTRACT: This invention is an auxiliary wheel which can be added to the standard propelling and supporting wheels of a vehicle to provide additional support, additional traction and may also be used separately or simultaneously as a capstan to provide additional propulsive force for the vehicle. The design of this invention is such that the standard propelling wheels need not be removed, the vehicle need not be elevated, and in the case of many vehicles such as standard passenger automobiles, the body or fender structure of the vehicle need not be modified.

PATENTED OCT 12 1971 3,612,613
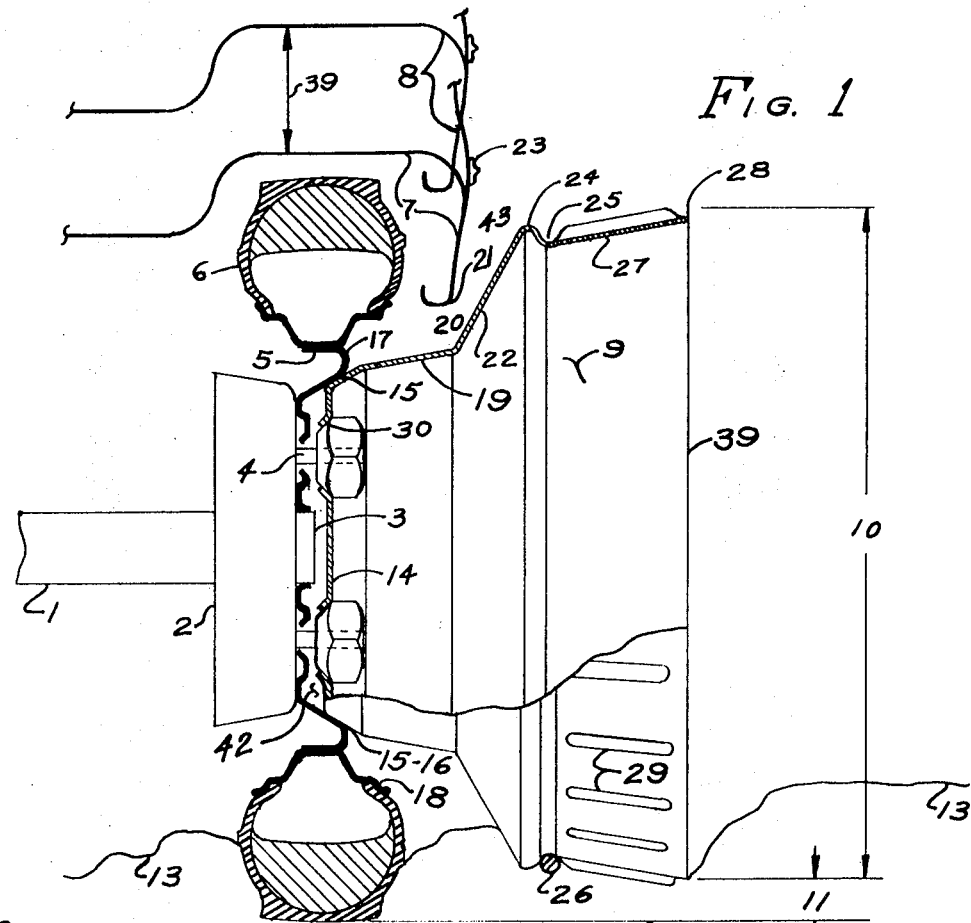
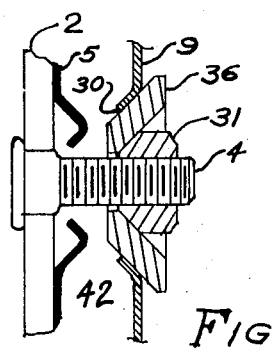
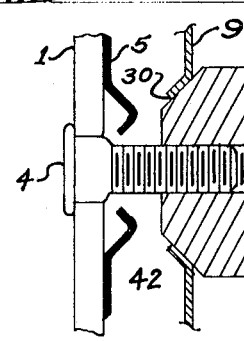
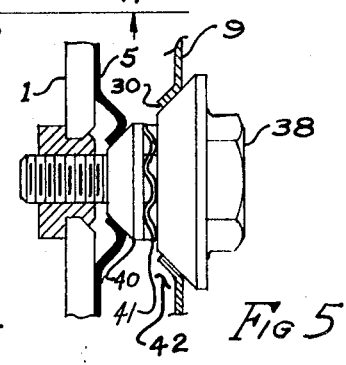
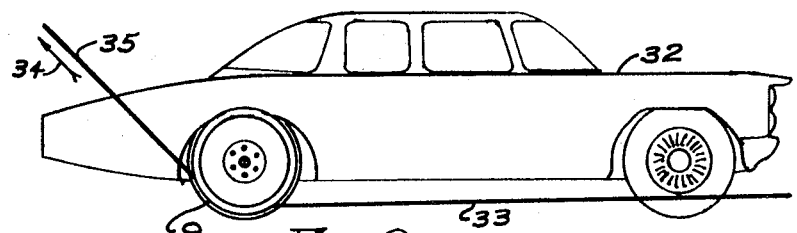
INVENTOR: Alfred J. Tricon

AUXILIARY SUPPORTING, TRACTIVE AND CAPSTAN WHEEL FOR VEHICLES

This application is a continuation in part of my copending application Ser. No. 832,370, filed July 24, 1969, now abandoned, titled "Auxiliary Supporting, Tractive Capstan Wheel for Vehicles." The abstract, its scope and intended implementation remain unchanged. This invention relates to vehicle wheels, and more particularly relates to auxiliary attachment wheels to be added to a vehicle under special conditions of use.

Dual wheels and wheels provided with greatly oversized tires and other means for trucks, military vehicles, marsh buggies and beach buggies are well known. The distinct disadvantage of such wheels can be observed for all of these vehicles is simply that the basic body structure has been especially designed or removed to accommodate the increased volume of these special wheels.

The increasing use of standard vehicles by people who go to the beaches, woodlands and mountains for outdoor recreation causes them to be more susceptible to entrapment by soft sands or soils or wet or flooded sands or soils encountered off hard roads. In the case of vehicles being entrapped by the sand and moving waves on the beach, it is necessary that additional flotation and tractive effort be provided quickly. This invention is a wheel of very novel design and extremely easy attachment, and, of utmost importance, its structure allows its use on a standard automobile or pickup truck without modification of the vehicle's wheel, fender or body structure. The design is also such that is permits nesting of these wheels one within the other, reducing storage volume.

Other features of my invention will become apparent during the following discussion of the drawing, wherein:

FIG. 1 is a sectional view of a portion of a vehicle body and suspension showing a pneumatic-tire carrying wheel supplemented by an auxiliary wheel according to the present invention:

FIG. 2 is an elevation view of a vehicle equipped with an auxiliary wheel according to the present invention serving as a capstan and cooperating with a rope to urge the vehicle in a forward direction; and FIGS. 3, 4 and 5 are enlarged sectional views showing three embodiments of fasteners for mounting the auxiliary wheel over the pnuematic tire wheel in cooperation with existing fastenings of the vehicle.

DESCRIPTION

In FIG. 1, please note the standard typical automobile wheel parts drive shaft housing 1; brake drum 2; axle with wheel locating boss 3; standard wheel attachment fasteners 4 and 31; formed automobile wheel and rim assembly 5; resilient tire assembly 6; integral wheel fender or body-fender assembly shown in the heavy-loaded position 7; and the same automobile body fender shown in the light-load position 8.

The position of the body-fender assembly with respect to the tire and wheel and its vertical motion shown by arrow 39 are common for most standard passenger vehicles and light pickup trucks. This standard common design practice prohibits the use of truck type or military vehicle type dual wheels or large "flotation" tires on these vehicles without modification and mutilation of the vehicle to provide necessary space for the wheels and their movement.

The novel auxiliary supporting, tractive, capstan wheel is shown in partial cutaway 9. It may be fabricated by a number of methods such as forming or casting or spinning. The diameter 10 is less than the outside diameter of the tire 6, causing a clearance 11 between itself and a hard road surface 12. In use in sand or soft mud areas, the auxiliary wheel 9 and tire 6 would contact the bearing material whose surface would be approximately as shown by 13 to provide the necessary additional support and traction. The wheel 9 is provided with or without a center 14 over the boss 3; it is then provided with a set of conical holes 30; in alignment with and of the same number as the standard wheel fasteners 4, it is then provided with a cylindrical or conical shape 15 to a contact a shoulder of the vehicle wheel for its major support at 16, or on the wheel at 17, or 18 on the wheel rim. The clearance space 42 between wheel 9 and wheel 5 also between wheel 9 and axle 3 insures that said contact area is the only area of such contact. This continuous integral shape is designed with a cylindrical or conical cantilever section 19 whose length is such that it will provide generous clearance 20 between itself and the lowest part of the vehicle fender 21 when this fender is in its lowest high-load position 7. This continuous integral structure is then provided with a continuous radial conical surface section 22 providing generous clearance 43 between the body-fender assembly 7, body trim 23 and wheel 9 and providing additional diameter. It is then provided with an integral or supplementary bead 24 which provides a reentrant groove 25 which will act as a pulley when the wheel is used as a capstan. In such case, a rope or chain 26 would remain in the groove 25 when large and slightly misaligned forces are being exerted by the rope or chain. The wheel 9 is then provided with the customary and historic earth contact drum section serving as a tire 27 of traditional cylindrical or slightly conical shape whose width between 24 and edge 28 is great to provide the customary large bearing area, as on tractors, etc., where flotation is a problem. The surface of the load bearing area 28 may be provided with common tractive treads 29 which may be integrally formed or cast on the surface or added thereto in the same or other materials. These tractive treads may assume a variety of configurations.

The above-noted conical holes 30 are suitably sized as shown in FIGS. 1 through 5 to permit passage and operation of a wrench for removal and installation of the standard wheel fasteners 31 of the standard vehicle wheel 5, said sizing thereby constituting a major complementary consideration providing this structure with novel installation capability.

When the standard fasteners 31 are to be used, a new washer fastener 36 (FIG. 3) is provided, said fastener being suitable shaped internally to receive the conical surface of the standard fastener 31 and externally sized and shaped to bridge to, and fit to the hole 30. An alternate fastener 37 (FIG. 4) is provided which transmits its holding force from standard fastener 4 directly to the conical surface of hole 30 in auxiliary wheel 9.

A second alternate fastener arrangement is shown in FIG. 5 which provides for a bolt fastener 38 which transmits most of its holding force to the conical surface of hole 30 while transmitting some of this force through spring 41 to washer 40, which is internally drilled to be free on fastener 38 and externally shaped to fit the hold of the standard wheel 5, thereby transmitting this latter smaller force to wheel 5.

The fasteners of FIGS. 3, 4 and 5 therefore transmit their holding force to the holes 30, thence through the auxiliary wheel 9 structure to the contacting region at 15, thence to the vehicle wheel 5 and thence to the drum 2 by exerting an opposing tension on fasteners 4.

Unique to this invention is the proportioning of the wheel 9 between the contacting regions 15 and the vehicle wheel at 16, 17 or 18 so that a clearance space 42 is provided between the vehicle wheel 5, its associated axle 3 and drum 2 and the auxiliary wheel 9. This provision allows for springing deflection of that region of the auxiliary wheel 9 between previously mentioned contact regions at 15 and the fastener holes 30, such deflection assuring more even distribution of the load among the fasteners thereby enhancing the structural integrity of the fastener system.

The unique design of the fastener holes 30 of the auxiliary wheel and the fasteners 36, 37, 38, 40 and 41 provide the tangible embodiments necessary for the quick and easy installation and removal of the auxiliary wheel 9, never sacrificing the holding force of more than one fastener at a time and obviating the necessity of elevating the vehicle or the vehicle's wheel during said installation or removal of the auxiliary wheel. Further important features contributing to efficient functioning of the invention during use are the previously noted clearances 20 and 43 which provide for the installation and functioning of the auxiliary wheel 9 without modification or removal of any of the vehicle's standard body or fender assemblies 7, 8.

During use a person performs the following sequence to install the auxiliary wheel 9 on the vehicle wheel 5: The auxiliary wheel 9 is placed in the position shown in FIG. 1 with the holes 30 over the fasteners 4 and 31 while said fasteners are still holding wheel 5 in place. One vehicle fastener 31 is removed and a new fastener shown in any of FIGS. 3, 4 or 5 is installed at the same location The remaining fastener locations are removed and replaced one by one in the same manner. This provides the continuous holding function of all but one standard and new fasteners throughout the procedure for maximum continuous structural integrity. Said continuous maintenance of structural integrity provides for obviating the need of elevating either the vehicle or its wheel during installation or removal of the auxiliary wheel 9. The removal of the auxiliary wheel is accomplished by reversing the foregoing procedure. It is obvious that such reversed procedure also continuously maintains the wheel 5 rigidly in place.

It should be noted at this time that because the distance from brake drum 4 to the edge 39 of the auxiliary wheel 9 though variable must be considered to exert large cantilever forces to the fasteners, a fastener system making use of *all* of the vehicle fasteners is mandatory as the use of only two or three fasteners may overload them during supporting or capstaning and break one or more of them. Previous patents for dual wheels which do not require elevating of the vehicle for their installation or removal also do not provide this unique installation capability, and do not use all of the fasteners and are therefore weaker. Previous patents that do use all standard fasteners and are therefore weaker. Previous patents that do use all standard fasteners also require that the vehicle or wheel be elevated for their installation or removal, and are therefore slow and laborious.

Of course, other fastener designs can be made once the novelty of the present installation is disclosed.

FIG. 2 indicates the auxiliary wheel 9 attached to the rear propelling wheel of a vehicle 32 which is presumed to need additional forward force to propel it. In this situation the auxiliary wheel 9 is being used as a common capstan through the use of a rope or chain 33 which would be attached to some anchorage device such as a rock, tree, post or other vehicle somewhere in front of the vehicle 32. In common capstan usage, the rope would be wrapped one or more times around the auxiliary wheel in a clockwise direction for forward motion and thence held taut as shown by arrow 34 aft of the wheel as indicated by its position 35. The amount of force exerted by the person holding the rope aft of the wheel will determine the amount of slippage, if any, between the wheel 9 and the rope 33 in the normal capstan useage manner as desired. This capstan procedure can, of course, be used on more than one driving wheel simultaneously and reversed to cause forces to help propel the vehicle in a rearward direction.

It should be noted at this time that if desired, some of the wheels of the vehicle could be blocked to prevent rolling and one or more of the propelling wheels could be elevated from the surface of the ground and the capstan operation could be used to exert a force to pull another vehicle or other object. Inasmuch as any length of rope or chain may be used in this operation, it then may become available for a variety of rescue or pulling operations.

The foregoing description represents this unique, novel and most useful wheel system in a rather simple form; numerous modifications in its basic novelties may be made to complement various vehicles'wheels and other conditions as may be needed for other situations, and no attempt is made herein to describe all such possible modifications which fall within the spirit and novelty of this invention.

No claim is made on the innumerable fender and/or body designs of the various automobiles or pickup trucks but only to provide for their existence and movement.

What is claimed is:

1. In combination with a vehicle having a drive wheel and having a fender portion covering the upper portion of the wheel, said vehicle wheel having a bolt-on central portion recessed within an annular shoulder portion located radially outwardly of the central portion, an auxiliary wheel comprising a central bolt-on mounting plate spaced axially from the vehicle wheel central portion and joined to the inner periphery of an outwardly tapered section interfitting with the vehicle shoulder portion, an approximately cylindrical cantilever section joined to the outer periphery of the tapered section and extending axially outwardly from said tapered section beyond said vehicle fender portion, thereby to provide clearance with said vehicle fender portion and merging into a rapidly outwardly flaring conical section, an axially extending ground-engaging drum section at the outer periphery of said auxiliary wheel and including an annular groove for use as a capstan wheel, and lug bolt mounting means passing through the two wheels and including axially spaced conical means for separately engaging and clamping the vehicle wheel central portion and said auxiliary wheel mounting plate, respectively.

2. Auxiliary wheel means to be attached to and overlie a vehicle wheel supported on a hub by a series of fasteners spaced therearound, the vehicle wheel being disposed within the outer contour of adjacent vehicle body parts and having a dished-in center for receiving said hub fasteners surrounded by an outwardly tapering annular shoulder approaching the rim of the vehicle wheel, said auxiliary wheel means comprising an essentially cup-shaped structure including an outwardly enlarging tapered section having an outer surface sized to fit within and against said shoulder and joining at its inner periphery a substantially radially disposed inner mounting plate adapted to be spaced from sad dished-in center when the tapered section is mated with the shoulder; the tapered section joining at its outer periphery an annular generally cylindrical cantilever section adapted to extend outwardly from the vehicle wheel to clear said body parts, a conical section joining said cantilever section and flaring radially outwardly so as to extend nearly to the normal road-contacting diameter of the vehicle wheel, and a ground-contacting drum section joined to the outer periphery of the conical section and having a reentrant annular capstan groove around its periphery adjacent to the conical section.

3. In auxiliary wheel means as set forth in claim 2 to be secured to a vehicle hub by fasteners which comprise screw lugs extending from the hub through openings near the center of the vehicle wheel to receive lug nuts removable by a lug wrench, the inner mounting plate of the auxiliary wheel having holes therethrough to receive said screw lugs, the latter holes being large enough to pass said lug wrench, and said mating fastener means comprising screw-thread supported means of diameter larger than said latter holes and having inner ends adapted to enter and seat in said latter holes and center them on said lugs while tightening said tapered section against said vehicle wheel shoulder.

4. In auxiliary wheel means as set forth in claim 3, washer means adapted to fit on said lugs and pass through said holes in the auxiliary wheel mounting plate and abut the lug openings in the center of the vehicle wheel, and the washer means being contacted by said mating fastener means and tightened thereby against the vehicle wheel.